(12) United States Patent
Wurm et al.

(10) Patent No.: US 10,995,727 B2
(45) Date of Patent: May 4, 2021

(54) POWER GENERATION PLANT HAVING A KAPLAN, BULB, DIAGONAL FLOW OR PROPELLER TURBINE

(71) Applicant: ANDRITZ HYDRO GmbH, Vienna (AT)

(72) Inventors: Erich Wurm, Hagenberg (AT); Bernd Nennemann, Pointe-Claire (CA)

(73) Assignee: Andritz Hydro GmbH, Vienna (AT)

( * ) Notice: Subject to any disclaimer, the term of this patent is extended or adjusted under 35 U.S.C. 154(b) by 100 days.

(21) Appl. No.: 16/460,256

(22) Filed: Jul. 2, 2019

(65) Prior Publication Data

US 2020/0011285 A1  Jan. 9, 2020

(30) Foreign Application Priority Data

Jul. 3, 2018 (AT) ............................. A 50568/2018

(51) Int. Cl.

| F03B 3/18 | (2006.01) |
|---|---|
| F03B 3/06 | (2006.01) |
| F03B 3/14 | (2006.01) |
| F03B 13/10 | (2006.01) |

(52) U.S. Cl.
CPC ............... F03B 3/183 (2013.01); F03B 3/06 (2013.01); F03B 3/14 (2013.01); F03B 13/105 (2013.01); F05B 2240/12 (2013.01)

(58) Field of Classification Search
CPC ...... F03B 3/04; F03B 3/06; F03B 3/14; F03B 3/18; F03B 3/105; F03B 3/183; F05B 2240/10; F05B 2240/12; Y02E 10/20
See application file for complete search history.

(56) References Cited

U.S. PATENT DOCUMENTS

| 2,028,368 | A | * | 1/1936 | White | F03B 11/00 415/162 |
|---|---|---|---|---|---|
| 3,237,563 | A | * | 3/1966 | Hartland | F03B 3/10 415/1 |
| 4,017,211 | A | | 4/1977 | Alestig et al. | |
| 4,120,602 | A | * | 10/1978 | Megnint | F03B 15/005 415/1 |
| 6,016,600 | A | * | 1/2000 | Kennell | F03B 3/02 29/889.1 |
| 8,536,719 | B2 | * | 9/2013 | Holstein | H02K 9/19 290/43 |
| 8,834,102 | B2 | * | 9/2014 | Bremond | F03B 3/18 415/150 |

(Continued)

FOREIGN PATENT DOCUMENTS

| AT | 248255 | 7/1966 |
|---|---|---|
| AT | 284034 | 8/1970 |

(Continued)

*Primary Examiner* — Justin D Seabe
*Assistant Examiner* — Ryan C Clark
(74) *Attorney, Agent, or Firm* — Nixon & Vanderhye P.C.

(57) ABSTRACT

A power generation plant including a turbine (1) of a Kaplan, bulb, diagonal flow or propeller turbine type, a water intake (4) and a water run-off (5). Additional vanes vane (8) are deployable into a water passage formed between the water intake (4) and the housing of the turbine. Eddy flows formed in the water intake (4) are reduced by the additional vanes. The vanes allow the turbine operating range to be extended to cover smaller outputs.

14 Claims, 4 Drawing Sheets

(56) References Cited

U.S. PATENT DOCUMENTS 9,641,049 B2 * 5/2017 Vuillerod ............. H02K 7/1823

FOREIGN PATENT DOCUMENTS

| | | |
|---|---|---|
| CH | 175431 | 2/1935 |
| DE | 1 503 279 | 4/1970 |
| EP | 2 399 022 | 12/2011 |
| GB | 1148826 | 4/1969 |
| WO | 2012/059174 | 5/2012 |

* cited by examiner

POWER GENERATION PLANT HAVING A KAPLAN, BULB, DIAGONAL FLOW OR PROPELLER TURBINE

RELATED APPLICATION

This application claims priority to Austrian Patent Application No. A50568/2018, filed Jul. 3, 2018, the entirety of which is incorporated by reference.

FIELD OF INVENTION

The invention relates to a power generation plant with a Kaplan, bulb, diagonal flow or propeller water turbine, a water intake and a water run-off.

BACKGROUND

Exemplary water turbine types are Kaplan, diagonal flow, propeller and bulb turbines. While operating at low power, these water turbines may be subjected to severe pressure fluctuations in the water flow due to eddy flows formed in the intake between the guide vane and the runner of the turbine. These severe pressure fluctuations cause vibrations in the turbine that may limit the operating range of the turbine, especially in low power operational conditions. Water turbines typically operate at low power during turbine start-up, low output or in lock or coasting modes when water passes through the turbine without generating turbine output. There is a long felt need to avoid restrictions in the operational range of a water turbine, especially in low power operational conditions.

Rotatable guide vanes in Frances turbines in the water run-off are known, such as shown in EP2399022A1, to stabilize water through-flow. Similarly, DE1503279, AT284034, AT248255 and WO2012/059174 disclose Francis-type pump turbines where auxiliary vanes are used to improve or adjust the efficiency in pump or turbine operations. These auxiliary vanes have no corresponding effect in axial turbines.

SUMMARY OF INVENTION

The invention may be used to reduce eddy flow formation in the water intake to a water turbine, such as a Kaplan, bulb, diagonal flow, propeller type turbine or other axial water turbines.

To reduce eddy flow formations, one or several separate, additional vanes are inserted, e.g., pivoted or slid, into the water intake through openings provided in the water intake. The insertion of the additional vane(s) reduces eddy formation and allows the operating range of the water turbine to be expanded, such as to allow greater low power operation of the turbine. The temporary insertion of the additional vanes allows operation of the water turbine at low outputs without causing pressure fluctuations sufficient to prevent turbine operation at the low outputs. As the power output of the water turbine increases the additional vanes are retracted from the water intake. Thus, during higher power outputs, the vanes need not be in the water flow and do not affect the operation of the water turbine. Moreover, existing water turbines may be retrofitted with these additional vanes to extend the operation of the existing water turbines into low power output conditions.

The invention may be embodied by additional vanes that are either permanently mounted to the water intake or housing of the turbine such that the additional vanes are always in the water flow passage between the water intake and housing.

Alternatively, the additional vanes may be mounted to the water intake or housing of the turbine such that the additional vanes swing into or slide into the water flow during certain operations of the water turbine and are retracted from the water flow during other operations. The additional vanes may rotate about vane axes to move into and out of the water flow through the water intake. The additional vanes may alternatively move in a linear direction between deployed and retracted positions.

The invention may be embodied with, for example, four to eight, additional vanes added to a new or existing axial water turbine, such as Kaplan, bulb, diagonal flow and propeller water turbines. The additional vanes are mounted to move in and out of the water flow passages feeding water to the turbine. The additional vanes may be arranged symmetrically about an axis of the rotational axis of the turbine such that the vanes are uniformly spaced in the water passage.

A motor or other drive mechanism may swing or slide the additional vanes into and out of the water flow passage. For example, pneumatic or hydraulic driven cylinders or an electrically driven actuator are configured to drive and move the additional vanes. These drive mechanisms may be manually or automatically controlled, such as by an operator in a control room for the water turbine.

SUMMARY OF FIGURES

The invention is described in the following in examples and referring to the drawings, where.

DETAILED DESCRIPTION

Figure 1:
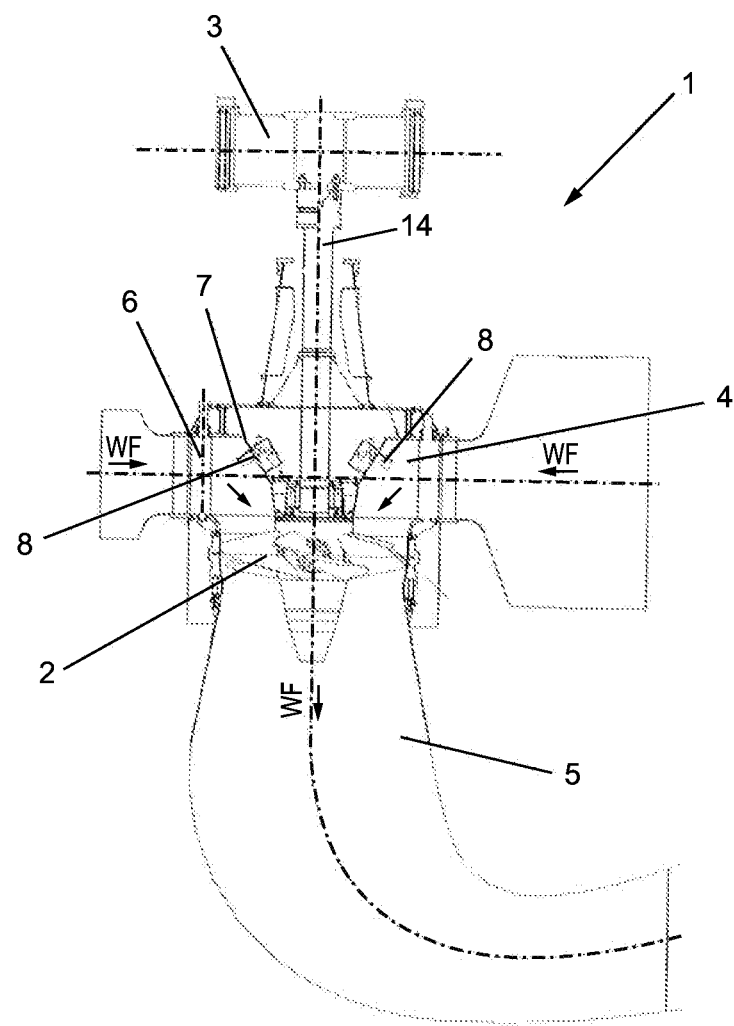
FIG. 1 shows a plant according to the invention with a Kaplan turbine.

FIG. 1 shows a plant for power generation with a water turbine 1, which includes a Kaplan turbine with Kaplan runners 2. The rotor for the runners 2 is connected to a generator 3 by a shaft 14. Water flows through a water intake 4 that includes a spiral shaped flow passage that turns towards an axial flow direction to feed the water into the runners 2 of the turbine. After flowing through the runners, water flows through a water run-off device 5, such as a conical draft tube.

The water intake 4 has a spiral shaped water flow passage in the embodiment shown in FIG. 1. Guide vanes 6 are mounted in the water flow passage between the water intake and the housing for the rotor of the turbine. The guide vanes may be arranged in an annular array and be symmetrically arranged about the axis of the shaft 14. The guide vanes 6 are permanently positioned in the water flow passage. The guide vanes may be adjusted, such as being pivoted about their respective vane axes. The guide vanes may be adjusted, e.g. pivoted, to increase or reduce the flow rate of water into the turbine. The guide vanes span the flow passage, such as extending between a top to a bottom of the flow passage.

Downstream of the guide vanes, the flow passage through the water intake turns towards the turbine 2, such as by turning the water flow passage from an orientation generally parallel to a plane perpendicular to the axis of the shaft 14, e.g., a horizontal flow direction, to a direction generally parallel to the axis of the shaft, e.g., a vertical flow direction.

Within the portion of the water intake 4 that turns the flow towards the turbine, a turbine head cover 7 forms an inner wall of the water flow passage. The turbine head cover is all or a portion of the housing for the turbine and may extend from the rotor towards the generator. The turbine head cover 7 may have a downstream end that is adjacent the rotor and an upstream end that connects to an inner, upper edge of the water intake 4. Alternatively, the upstream end of the turbine head cover 7 may be downstream of the guide vanes.

The water flow near the surface of the turbine head cover 7 is prone to eddy flows during certain operational conductions, such as during low power operation of the turbine. The eddy flows may be evident by swirling or reverse water flow in the water intake. Eddy flows forming near the turbine head cover 7 can induce vibrations in the heat cover and, thus, the entire turbine. The acceptable operational range of the water turbine may need to exclude operational conditions during which eddy flows may induce large vibrations in the water turbine. To avoid having to exclude operation in conditions due to eddy current induced vibrations, the present invention has additional vanes which prevent or minimize the formation of eddy flows near the turbine head cover 7.

The additional vanes 8 are mounted at or near the turbine head cover 7. The additional vanes arranged to suppress formation of eddy flows near the turbine head cover. The additional vanes may only extend partially into the water passage when extended into the water passage. For example, the additional vanes may extend only one-quarter or less the width of the water flow passage adjacent the turbine head cover 7. For example, the additional vanes may extend between one-quarter and one-sixteenth the width, or one-eighth to one-twentieth the width. The width of the water flow passage is the radial distance between the turbine head cover and the water intake.

The additional vanes, when extended into the water passage, may be oriented such that they minimize their flow resistance to the water flowing through the water intake. For example, additional vanes may be shaped as blades, plates, ribs, fins or have some other shape which is configured to suppress eddy flows. The additional vanes may have a cross sectional shape in which the width of the vane is narrow as compared to the length of the vane, such as a width that is $\frac{1}{5}$, $\frac{1}{10}$ or less than the length. The length of the vane may be oriented to be aligned with a flow direction of the direction of water flow over the vanes. The vanes may alternatively be shaped to have, for example, a tear-drop cross section, a thin diamond cross-section, a rectangular cross section and a race-track cross section.

The additional vanes 8 may be arranged on the wall of the turbine head cover 7 in one or more rows forming an annulus centred on the axis of the shaft 14. The spacing between the additional vanes 8 in each row may be uniform. For multiple rows, the additional vanes in one row may be offset from the vanes in an adjacent row along a direction of the axis of the shaft. There may be four to eight additional vanes in at least one row. Although there may be more or fewer additional vanes depending on the size of the water intake 4 and head cover 7 and the severity of the eddy flows.

The additional vanes 8 may be configured to move into and out of the water passage between the water intake and the head cover 7. Openings 15 in the turbine head cover 7 allow the additional vanes 8 to enter and be retracted from the water flow passage in the water intake 4. The additional vanes may be selectively moved into the water flow passage such that some but not all additional vanes are deployed into the water flow passage. An operator may manually select the additional vanes to deploy into the water flow passage, such as in response to vibrations in the turbine. Or, a control system may automatically selectively deploy additional vanes by executing a control program which specifies the additional vanes to be deployed and retracted based on the operation conditions of the turbine, such as whether the turbine is in a low power mode of operation.

FIG. 1 shows a Kaplan turbine 1 with axial runners 2, and a spiral water intake 4. The additional vanes 8 are mounted in the turbine at the head cover 7. There are 4 to 8 additional vanes in the embodiment shown in FIG. 1. The runners 2 may be turned about their respective radial axis to align the runners with the direction of water flow over the runner.

Figure 2:
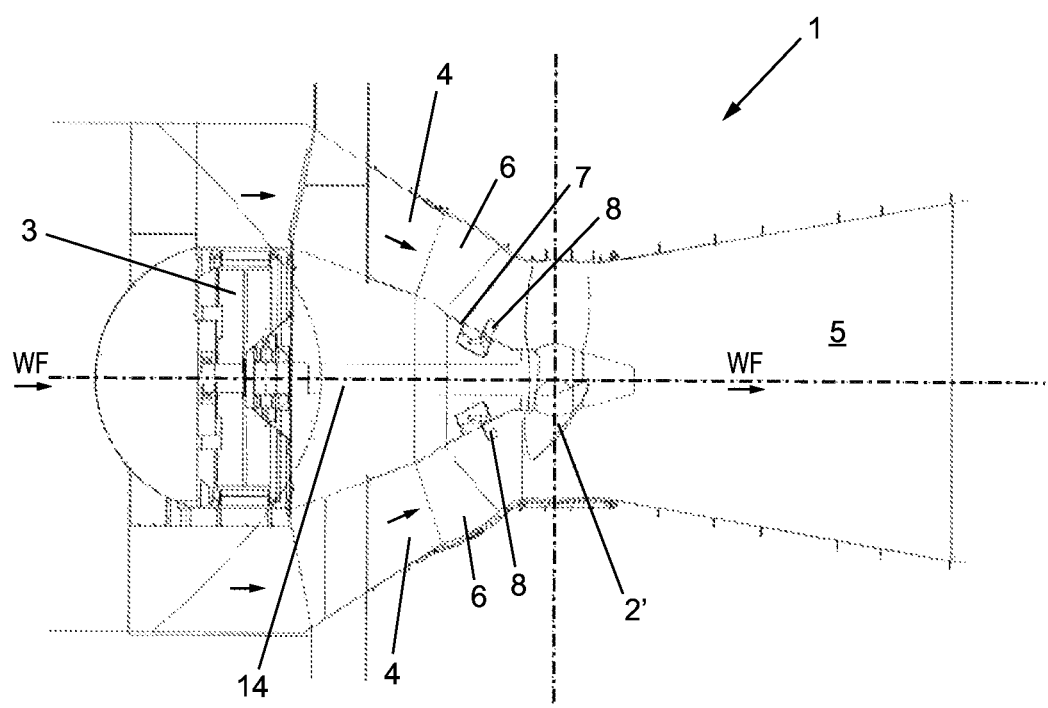
FIG. 2 shows a plant according to the invention with a bulb turbine.

FIG. 2 shows a bulb water turbine 18 including runners 2' on an axial flow device. The runners 2' are driven (rotated) by water flow and turn a shaft 14 that drives a generator 3 housed in the bulb water turbine. An axial flow water intake housing 19 guides water from an inlet to the runners 2' and forms an outer housing for the bulb water turbine. The water flows through a generally axial passage formed between the water intake housing 19 and the bulb shaped housing of the turbine 18. Guide vanes 6 direct the water flow into the runners 2'.

A frustoconical turbine head cover 20 of the bulb water turbine housing 18 is between the guide vanes 6 and the rotor supporting the runners 2'. The additional vanes 8' are mounted at the frustoconical head cover 20 and may be selectively deployed into the passage downstream of the guide vanes and upstream of the runners 2'. The additional vanes 8' may be arranged symmetrically around the axis of the shaft and may be arranged in one or more rows. Each row may have four to eight additional vanes 8'. The additional vanes 8' may extend into the water passage from the frustoconical head cover 20 a radial distance of one quarter, one-fifth, or one-eighth, for example, of the radial distance between the frustoconical head cover and the water intake housing 19.

Figure 3A:
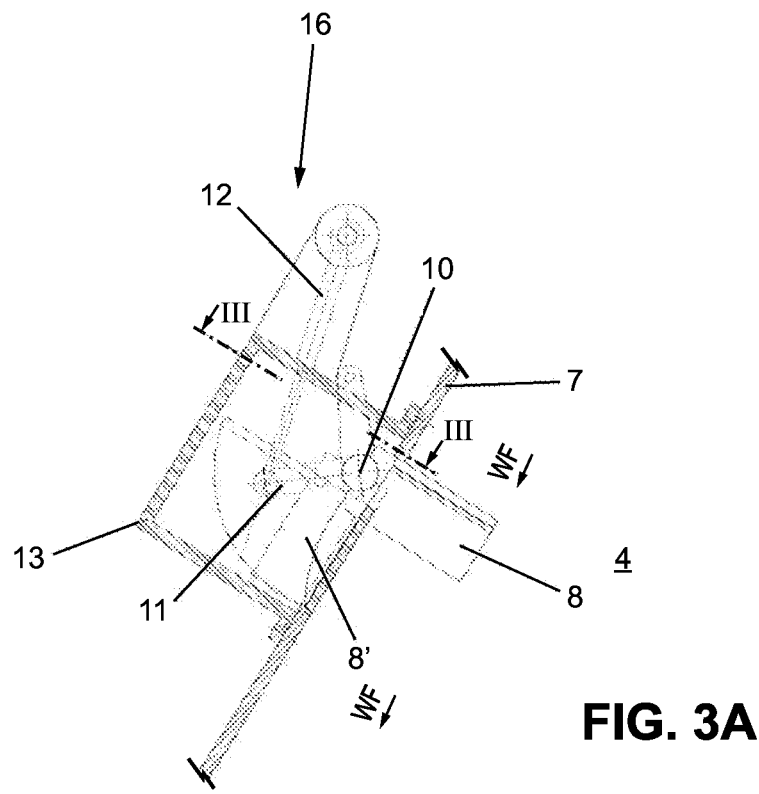
FIG. 3a shows a first variant of an additional vane in a side view.
Figure 3B:
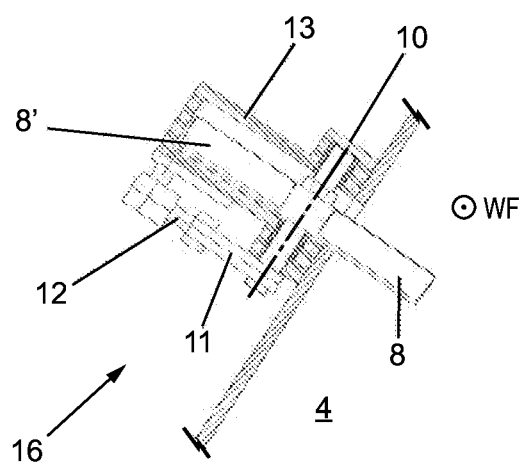
FIG. 3b shows a first variant of an additional vane in view III-III according to FIG. 3a, FIG. 4a shows a second variant of an additional vane with the vane extended.

Detailed views of a first additional vane assembly 16 are shown in FIG. 3a, which shows a cross sectional view of a side of the first additional vane assembly 16, and in FIG. 3b that shows a cross sectional view perpendicular to the view shown in FIG. 3a. The additional vane 8 is supported by a pivot mount 10 about which the vane 8 pivots from a deployed position (vane 8 in water flow WF) and a retracted position (vane 8'). The additional vane 8 may be mounted at a leading or trailing edge of the base of the vane. A lever 11 may also be attached to the pivot mount 10 and used to turn (pivot) the vane between the deployed and retracted positions. The lever may be driven by, for example, a hydraulic, pneumatic, electro-mechanical actuator 12, or a piston or spindle. The lever may be manually or automatically controlled. The vane 8 may be housed in a casing 13 that is in the water turbine casing or water intake. An open end of the casing 13 is fixed to an inside surface of the head cover or the frustoconical head cover 20. A seal at the open end of the casing is configured to prevent water flow into the casing 13 while allowing the vane to be deployed and retracted.

Figure 4A:
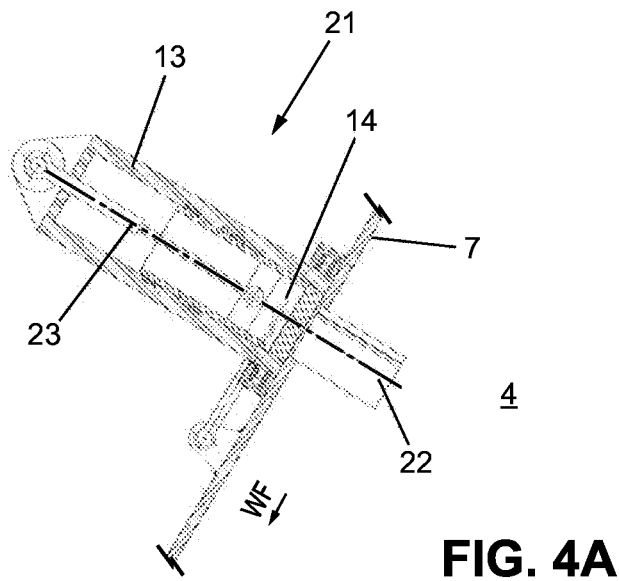
FIG. 4b shows a second variant with the vane retracted.
Figure 4B:
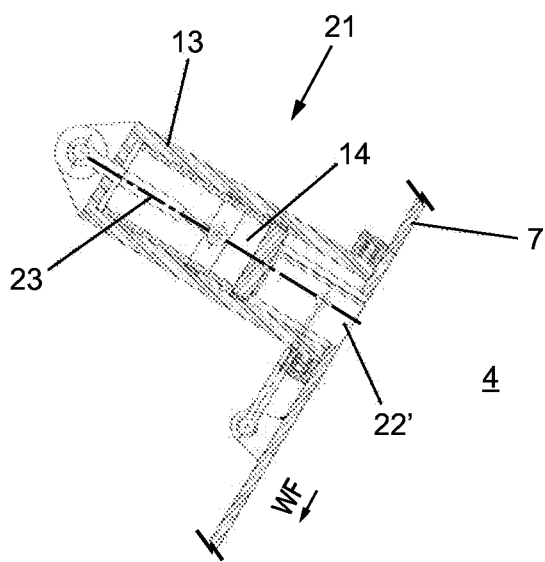

A detailed view of a second additional vane assembly 21 is shown in FIG. 4a, which shows a cross sectional view of the second additional vane assembly with the additional vane 22 extended. FIG. 4b shows a cross sectional view of the second additional vane assembly in which the additional vane 22' is retracted. The additional vane 22 is deployed and retracted into the water flow (WF) by a linear movement driven by a linear actuator 23, controlled manually by an operator in a control room from the water turbine or automatically controlled by a computer controller for the water turbine. The linear actuator 23 moves a shaft 14 along the axis of the casing to deploy and retract the additional vane 22, 22'. The additional vane 22 is housed in a casing 13 that supports the linear actuator at one end and at an opposite end attached to the inside surface of the head cover or the frustoconical head cover 20. A seal at the open end of the casing is configured to prevent water flow into the casing 13 while allowing the vane 22 to be deployed and retracted.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A power generation plant comprising:
   a water turbine of a Kaplan, a bulb, a diagonal flow or a propeller turbine type;
   a water intake with at least one opening;
   a water run-off; and
   at least one additional vane configured to be inserted into the at least one opening of the water intake, wherein the at least one additional vane is configured to be pushed into the at least one opening.

2. The power generation plant according to claim 1, wherein the at least one additional vane is configured to swing into the at least one opening.

3. The power generation plant of claim 1, wherein the at least one additional vane is configured to rotate about an axis.

4. The power generation plant of claim 1, wherein the at least one additional vane is a plurality of vanes arranged around a perimeter of the water intake.

5. The power generation plant of claim 1, further comprising at least one actuator configured to adjust the at least one additional vane.

6. The power generation plant of claim 5, wherein the at least one actuator is at least one of a pneumatic cylinder, a hydraulic cylinder and an electrically driven adjusting device.

7. A power generation plant comprising:
   a water turbine including a water inlet and a water outlet;
   a water intake configured to direct water into the inlet of the water turbine, the water intake including a housing defining a water inlet passage, and inlet guide vanes within the housing and arranged around the inlet to the water turbine; and
   additional vanes configured to move between a first operational position out of the water inlet passage and a second operational position in the water inlet passage, wherein the additional inlet vanes move through openings in a housing of the water turbine while moving between the first and second operational positions.

8. A water turbine assembly comprising:
   a rotor with runners;
   a head cover upstream of the rotor;
   a water intake housing surrounding the rotor and the head cover;
   a water flow path between the water intake housing and the head cover;
   guide vanes spanning the water flow path and mounted to the water intake housing and/or the head cover; and
   additional vanes mounted to the head cover are downstream of the guide vanes and upstream of the runners, wherein the additional vanes are configured to be deployed into the water flow path and retracted from the water flow path.

9. The water turbine of claim 8, wherein the water turbine is one of a Kaplan turbine, bulb turbine, diagonal flow turbine and a propeller turbine.

10. The water turbine of claim 8, wherein the water turbine is an axial flow water turbine.

11. The water turbine of claim 8, wherein the additional vanes extend less than one half a radial distance between the head cover and the water intake housing.

12. The water turbine of claim 8, wherein the additional vanes extend less than one quarter of a radial distance between the head cover and the water intake housing.

13. The water turbine of claim 8, wherein the additional vanes are arranged symmetrically around a rotational axis of the rotor.

14. The water turbine of claim 8, wherein the additional vanes are configured to be deployed only during low power operation of the water turbine.

* * * * *